(12) United States Patent
Tiscareno et al.

(10) Patent No.: US 8,207,906 B2
(45) Date of Patent: Jun. 26, 2012

(54) ANTENNA INSERT

(75) Inventors: Victor M. Tiscareno, Issaquah, WA (US); John G. Tang, San Carlos, CA (US); Stephen P. Zadesky, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 629 days.

(21) Appl. No.: 11/970,504

(22) Filed: Jan. 7, 2008

(65) Prior Publication Data

US 2008/0165066 A1    Jul. 10, 2008

Related U.S. Application Data

(60) Provisional application No. 60/884,014, filed on Jan. 8, 2007.

(51) Int. Cl.
*H01Q 1/50* (2006.01)
(52) U.S. Cl. ....................................... 343/906
(58) Field of Classification Search ............. 455/89–90; 343/702, 700 MS, 841, 895, 905–906
See application file for complete search history.

(56) References Cited

U.S. PATENT DOCUMENTS

| | | | |
|---|---|---|---|
| 3,191,122 A * | 6/1965 | Hussey | 455/7 |
| D328,277 S | 7/1992 | Leman et al. | |
| D336,631 S | 6/1993 | Ivester | |
| 5,233,281 A | 8/1993 | Chiang et al. | |
| 5,239,669 A * | 8/1993 | Mason et al. | 455/12.1 |
| 5,280,229 A | 1/1994 | Faude et al. | |
| 5,357,185 A | 10/1994 | Chen | |
| 5,668,561 A | 9/1997 | Perrotta et al. | |
| D388,764 S | 1/1998 | Bartling et al. | |
| 5,898,290 A | 4/1999 | Beard et al. | |
| D409,987 S | 5/1999 | Okumura | |
| D411,166 S | 6/1999 | Uemura et al. | |
| 5,920,293 A | 7/1999 | Perrotta et al. | |
| 5,926,005 A | 7/1999 | Holcomb | |
| D416,536 S | 11/1999 | Ross et al. | |
| D419,160 S | 1/2000 | Davidson et al. | |
| 6,042,414 A | 3/2000 | Kunert | |
| D422,556 S | 4/2000 | Okura et al. | |
| D427,970 S | 7/2000 | Sage | |

(Continued)

FOREIGN PATENT DOCUMENTS

EP    0766339 A2    4/1997

(Continued)

OTHER PUBLICATIONS

Hughes, Judie, "Atech Flash Technology iDuo iPod Dock and Card Reader," Gadgeteer Hands on Review, 9 pages, Nov. 17, 2005.

(Continued)

*Primary Examiner* — Huedung Mancuso
(74) *Attorney, Agent, or Firm* — Kilpatrick Townsend & Stockton LLP

(57) ABSTRACT

Circuits, methods, and apparatus for adapters and docking stations that include one or more of the following: reradiating antennas to enhance wireless signal integrity, inductive charging circuits, and wireless or optical data links. The adapters may be inserts for use in a docking station, adapters for a cable connection, or other type of device. One example provides an adapter that includes a reradiating antenna. In other examples, passive coupling is used to charge a rechargeable battery in the handheld device. Other examples include wireless or optical circuits for faster data transmission.

13 Claims, 15 Drawing Sheets

U.S. PATENT DOCUMENTS

| | | | |
|---|---|---|---|
| 6,115,247 A | 9/2000 | Helot | |
| 6,193,546 B1 | 2/2001 | Sadler | |
| D439,908 S | 4/2001 | Gozani | |
| D440,542 S | 4/2001 | Hawkins et al. | |
| D444,121 S | 6/2001 | Chun et al. | |
| D444,124 S | 6/2001 | Casey et al. | |
| 6,301,106 B1 | 10/2001 | Helot et al. | |
| D450,707 S | 11/2001 | Francavilla et al. | |
| 6,341,218 B1 | 1/2002 | Poplawsky et al. | |
| 6,344,727 B1 | 2/2002 | Desai et al. | |
| D454,332 S | 3/2002 | Yokoyama | |
| 6,394,300 B1 | 5/2002 | Bosy | |
| D459,299 S | 6/2002 | Hughes et al. | |
| D461,476 S | 8/2002 | Evers et al. | |
| D463,361 S | 9/2002 | Ruohonen | |
| D466,122 S | 11/2002 | Moody | |
| 6,483,698 B1 | 11/2002 | Loh | |
| D468,305 S | 1/2003 | Ma et al. | |
| 6,524,240 B1 | 2/2003 | Thede | |
| D472,900 S | 4/2003 | Matsumoto | |
| 6,716,058 B2 | 4/2004 | Youn | |
| D495,336 S | 8/2004 | Andre et al. | |
| 6,798,647 B2 | 9/2004 | Dickie | |
| 6,813,528 B1 | 11/2004 | Yang | |
| 6,831,609 B2 * | 12/2004 | Shively et al. | 343/702 |
| 6,898,080 B2 | 5/2005 | Yin et al. | |
| 6,961,237 B2 | 11/2005 | Dickie | |
| 6,994,575 B1 | 2/2006 | Clark et al. | |
| 6,996,369 B2 * | 2/2006 | Jimenez et al. | 455/13.3 |
| 7,014,486 B1 | 3/2006 | Wu et al. | |
| 7,030,819 B2 * | 4/2006 | Horibe | 343/702 |
| D525,616 S | 7/2006 | Andre et al. | |
| 7,075,579 B2 | 7/2006 | Whitby et al. | |
| 7,149,514 B1 * | 12/2006 | DePani et al. | 455/426.2 |
| 7,238,042 B2 | 7/2007 | Chen et al. | |
| D551,212 S | 9/2007 | Andre et al. | |
| D551,213 S | 9/2007 | Andre et al. | |
| D552,085 S | 10/2007 | Andre et al. | |
| D558,738 S | 1/2008 | Andre et al. | |
| D558,739 S | 1/2008 | Andre et al. | |
| 7,363,034 B2 * | 4/2008 | DePani et al. | 455/426.2 |
| 7,381,095 B2 | 6/2008 | Freeman et al. | |
| 7,480,138 B2 | 1/2009 | Kogan et al. | |
| 7,629,943 B2 * | 12/2009 | Tuttle | 343/872 |
| 7,673,083 B2 | 3/2010 | Laefer et al. | |
| 2002/0024794 A1 | 2/2002 | Lin et al. | |
| 2002/0032042 A1 | 3/2002 | Poplawsky et al. | |
| 2002/0103008 A1 | 8/2002 | Rahn et al. | |
| 2002/0115480 A1 | 8/2002 | Huang | |
| 2002/0163780 A1 | 11/2002 | Christopher | |
| 2002/0173273 A1 | 11/2002 | Spurgat et al. | |
| 2002/0186319 A1 | 12/2002 | Whitby et al. | |
| 2003/0097379 A1 | 5/2003 | Ireton | |
| 2003/0148740 A1 | 8/2003 | Yau et al. | |
| 2003/0198015 A1 | 10/2003 | Vogt | |
| 2004/0195305 A1 | 10/2004 | Dotson | |
| 2004/0224638 A1 | 11/2004 | Fadell et al. | |
| 2004/0267825 A1 | 12/2004 | Novak et al. | |
| 2005/0042999 A1 * | 2/2005 | Rappaport | 455/307 |
| 2005/0047099 A1 | 3/2005 | Mori et al. | |
| 2006/0181840 A1 | 8/2006 | Cvetko | |
| 2006/0250764 A1 | 11/2006 | Howarth et al. | |
| 2007/0002533 A1 | 1/2007 | Kogan et al. | |
| 2008/0304688 A1 | 12/2008 | Kumar | |

FOREIGN PATENT DOCUMENTS

| | | |
|---|---|---|
| EP | 1 104 150 A2 | 5/2001 |
| WO | WO 98/01919 A2 | 1/1998 |
| WO | WO 00-60450 A1 | 10/2000 |
| WO | WO 2004-084413 A2 | 9/2004 |
| WO | WO 2006-080659 A1 | 8/2006 |
| WO | WO 2008/086312 A1 | 7/2008 |

OTHER PUBLICATIONS

"iPodDock-iPod Cradle," www.bookendzdocks.com-bookendz-dock_cradle.html, downloaded Feb. 27, 2003.

Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.

Examiner's First Report for Australian Patent Application No. 2008204998, mailed on Aug. 11, 2010, 4 pages.

European Search Report for European Patent Application No. 08705744.4, mailed on May 5, 2011, 5 pages.

* cited by examiner

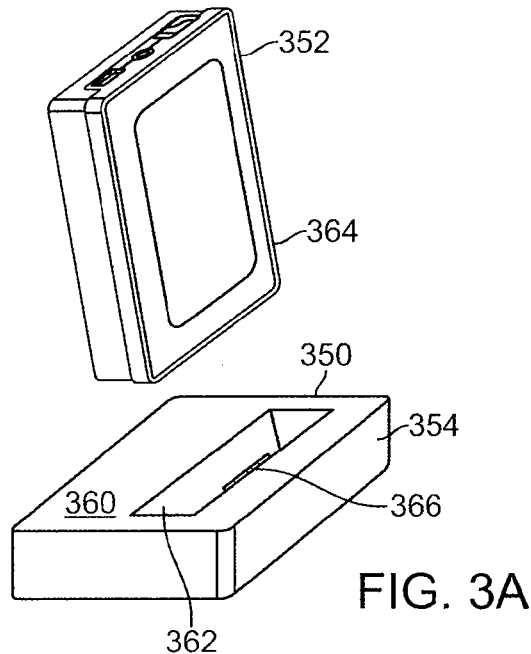
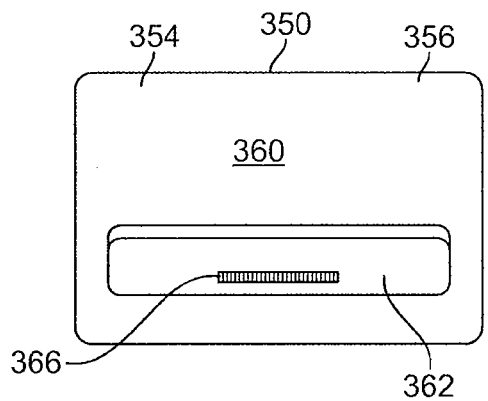
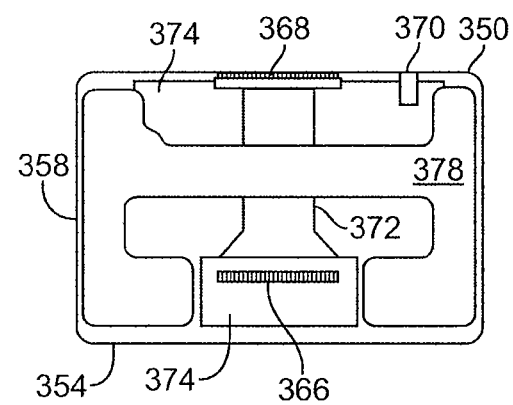
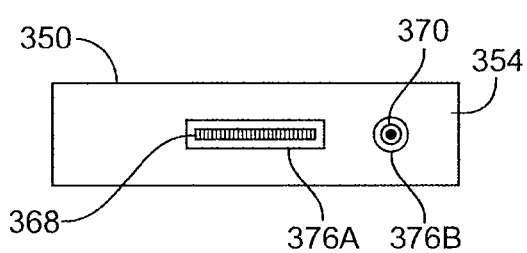
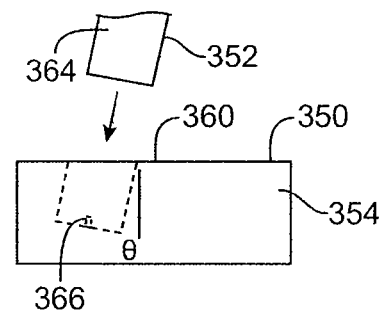

| Pin | Signal Name | I/O | Function |
|---|---|---|---|
| 1 | DGND | GND | Digital ground in mobile device. |
| 2 | DGND | GND | Digital ground in mobile device. |
| 3 | TPA+ | I/O | FireWire signal |
| 4 | USB D+ | I/O | USB signal |
| 5 | TPA- | I/O | FireWire signal |
| 6 | USB D- | I/O | USB signal |
| 7 | TPB+ | I/O | FireWire signal |
| 8 | USB Vbus | I | USB power in; used to detect a USB host. |
| 9 | TPB- | I/O | FireWire signal |
| 10 | Accessory Identify | I | Identify external accessory |
| 11 | F/W PWR+ | I | FireWire and charger input power (8V to 15V DC) |
| 12 | F/W PWR+ | I | FireWire and charger input power (8V to 15 DC) |
| 13 | Accessory Power | O | 3.3V is the nominal output. Nominal current in low power mode is 5 mA, with current limited to 100 mA in high power mode. |
| 14 | Reserved | | |
| 15 | DGND | GND | Digital ground in mobile device. |
| 16 | DGND | GND | Digital ground in mobile device. |
| 17 | Reserved | | |
| 18 | RX | I | Receive data |
| 19 | TX | O | Transmit data |
| 20 | Accessory Detect | I | Accessory Detect |
| 21 | S Video Y | O | Luminance component of S video. |
| 22 | S Video C | O | Chrominance component of S video. |
| 23 | Composite Video | O | Composite signal |
| 24 | Remote Sense | I | Detect remote |
| 25 | LINE-IN L | I | Line level input to the mobile device for the left channel. |
| 26 | LINE-IN R | I | Line level input to the mobile device for the right channel. |
| 27 | LINE-OUT L | O | Line level output to the mobile device for the left channel. |
| 28 | LINE-OUT R | O | Line level output to the mobile device for the right channel. |
| 29 | Audio Return | — | Audio return. This is a signal and should never be grounded inside the accessory. |
| 30 | DGND | GND | Digital ground in mobile device. |
| 31 | Chassis | | Chassis ground for connector shell. |
| 32 | Chassis | | Chassis ground for connector shell. |

FIG. 4

ANTENNA INSERT

CROSS-REFERENCES TO RELATED APPLICATIONS

This application claims the benefit of U.S. provisional application No. 60/884,014, filed Jan. 8, 2007, which is incorporated by reference.

BACKGROUND

Today's wireless handheld devices incorporate one or more antennas in order to provide wireless voice and data capability. These onboard antennas are unfortunately susceptible to various types of electromagnetic interference. For example, when external accessories (such as a cable or a docking station) are coupled with a wireless handheld device, they can interfere with the operation of the antennas, thus impairing the wireless capabilities of the handheld device. This is undesirable, particularly in situations when a user of the handheld device wishes to have wireless connection available while an accessory is connected to the handheld device. For example, a user may wish to have the cellular phone capability of a handheld device available while the handheld device is docked in a docking station for purposes of playing music.

To further exacerbate matters, in an effort to minimize human exposure to radio frequency (RF) energy emitted by wireless handheld devices, some handset manufacturers have moved the antenna to a region of the wireless device that is farthest from the head of a user. In wireless handheld devices such as cellular phones, this often means placing the antenna at the base of the handset instead of near the top as is traditionally done. It is also desirable to house the connector (which serves as the interface for power and data transmission) at the base of the handheld device to enable docking the device in a docking system such as a stand-alone docking station, a cradle, or a Hi-Fi audio system with integrated docking capability. However, with the antenna and the connector in close proximity at the base of the handheld device, the potential for RF interference from an external accessory coupled to the connector becomes even greater.

While handheld device manufacturers take steps in the design of both the handheld device and its accessories to ensure that the accessories do not adversely impact the wireless performance of the handheld device, there are many other accessories including older versions of the manufacturers' own accessories that were designed without wireless capability in mind, as well as after-market accessories, that may adversely impact the wireless performance of the handheld device.

Additionally, there exist today many styles of handheld electronic devices as, for example, cellular phones, personal digital assistants (PDA), media players (e.g., music player or video player), cameras, game players and the like. These devices come in various shapes and sizes (e.g., thickness, width and height). The size and shape is typically dependent on various form factors including, but not limited to, ease of use, ergonomics, aesthetics, and the size of the components inside or outside the device. While it is likely that different manufacturers may produce the same type of handheld electronic device with differing shapes and sizes, it is also likely that one particular manufacturer may produce different models of the same type of handheld electronic device with different shapes and sizes. Ensuring that all these various types and shaped of handheld devices can maintain proper antenna operation when coupled to various types of accessories would be advantageous.

Also, such devices currently require a physical connection to either a docking station, cable, or other device for battery charging and data transfer. The connectors used to make this connection can be awkward to use and require a user to properly align the handheld device to the connector.

Thus, there is a need for adapters, such as inserts and cable adapters, and docking stations that enhance the integrity of wireless communication with a handheld device when connected to an accessory. It is also desirable that at least some of these adapters and docking stations operate with a handheld device without using a physical connector.

SUMMARY

Accordingly, embodiments of the present invention provide circuits, methods, and apparatus for adapters, such as inserts and cable adapters, and docking stations that include one or more of the following: reradiating antennas to enhance wireless signal integrity, inductive charging circuits, and wireless or optical data links.

A specific embodiment of the present invention provides an adapter that includes a reradiating antenna. The reradiating antenna couples to an antenna internal to a handheld device in order to enhance the effectiveness of the internal antenna. The term "reradiating antenna" as used in this disclosure is intended to cover one or more antennas that both receive and transmit RF signals, such as voice and data signals.

These adapters may be inserts for use with a docking station, they may be adapters for cables, or they may be other types of devices. Removable dock inserts may be used with some docking stations to allow the docking station to fit a variety of handheld device form factors. In one embodiment where the docking station includes a connector, the reradiating antenna in the removable dock insert helps maintain the integrity of the wireless communication should the connector of the docking station interfere with the performance of the antenna inside the handheld device. Advantageously, this invention allows the reradiating antenna to be multiple antennas and of superior physical form factor than the antennas in the handheld device. This is particularly useful in applications where the handheld device is intended to operate over multiple frequency bands. Each of the reradiating antennas may be tuned for a different frequency band, thus making them more efficient for their intended purpose. In yet other embodiments, a removable housing is adapted to attach to a plug portion of a cable accessory, and is further adapted to operatively couple the antenna in the handheld device to reradiating antenna in order to improve the wireless communication with the handheld device.

The reradiating antenna may be passive, or it may be active, that is, it may be connected to an active gain circuit. Various embodiments of the present invention utilize a reradiating antenna for voice signals, others for data signals, and still other embodiments use the antenna for voice and data signals. Other processing circuits, such as circuits for converting data from one protocol to another, may also be included.

In other embodiments of the present invention, adapters and docking stations include passive coupling that is used to charge a rechargeable battery in the handheld device. Inductive coupling may be used for this charging circuit. The charging circuits may be included with reradiating antennas. When a charging circuit and reradiating antenna are both included, care is taken to avoid circuit interactions. For example, in various embodiments of the present invention, the circuits are shielded using cladding or Faraday cages. In other embodiments, they divide time between themselves, that is, only one circuit operates at a time. In still other embodiments, the frequency of operation for the charging circuit changes with time such that the spectrum of interference generated by the charging circuit is spread and thereby reduced.

In other exemplary embodiments of the present invention, a faster data rate than can be achieved via a reradiating antenna is desirable. Accordingly, these embodiments include faster data transfer circuitry, such as optical or wireless links.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIGS. 3A-3E are various perspective views of a stand-alone docking station particularly suitable for use with various embodiments of the present invention;

FIG. 4 illustrates an exemplary pinout that may be used for connectors such as the connectors in FIG. 3 as well as other connectors shown in these examples;

DESCRIPTION OF EXEMPLARY EMBODIMENTS

Figure 1:
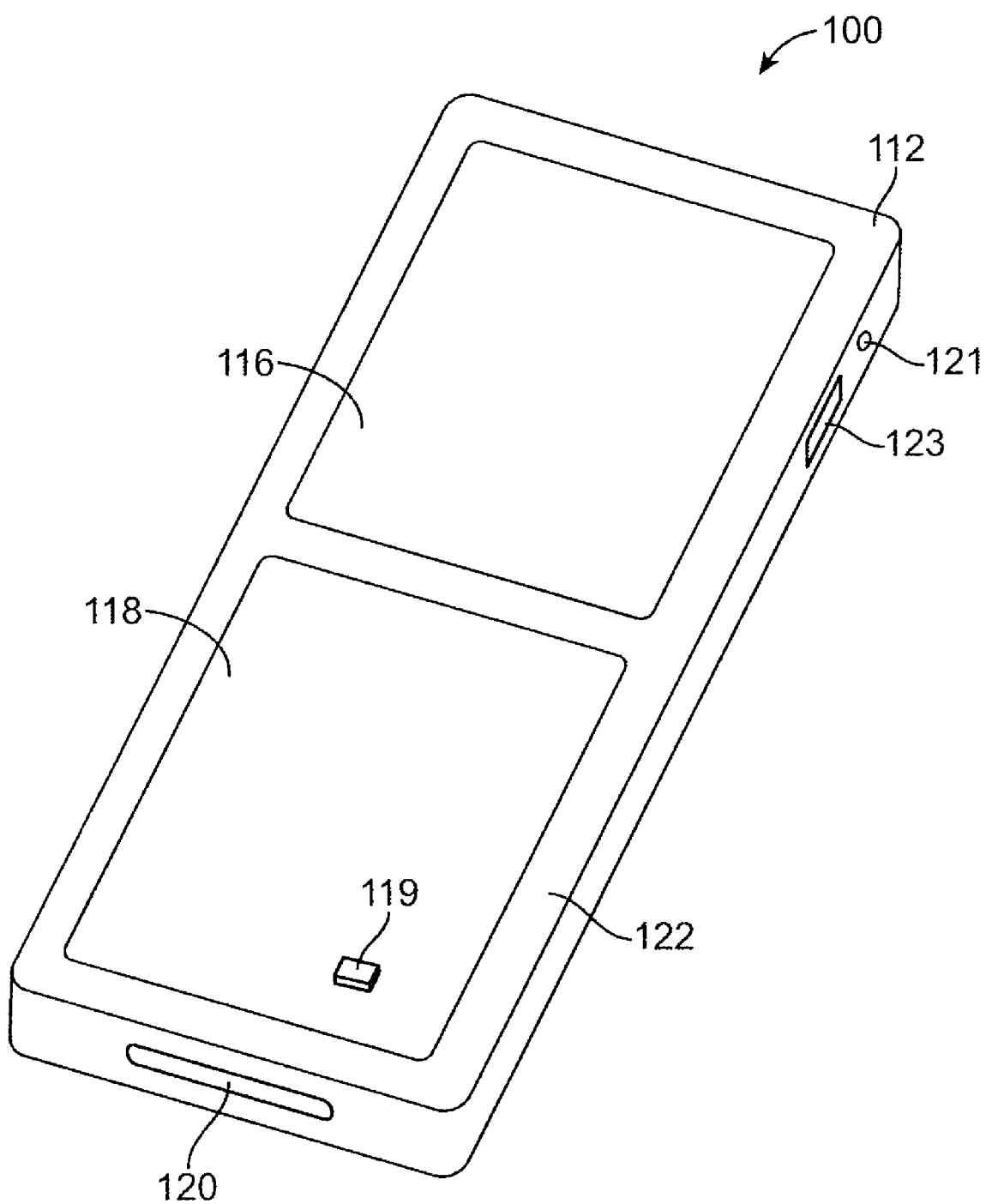
FIG. 1 illustrates a handheld device that may be used in conjunction with embodiments of the present invention.

FIG. 1 illustrates a handheld device that may be used in conjunction with embodiments of the present invention. Handheld device 100 includes housing 112 and includes at least one antenna (not shown). Housing 112, which is sometimes referred to as a case, may be formed of any suitable materials, including plastic, wood, glass, ceramics, metal, or other suitable materials, or a combination of these materials. In some embodiments, housing 112 may be a dielectric or other low-conductivity material, so that the operation of conductive antenna elements that are located in proximity to housing 112 is not disrupted. In other embodiments, housing 112 may be formed from metal elements that serve as antenna elements.

The antenna(s) in device 100 may have a ground element (sometimes called a ground) and a resonant element (sometimes called a radiating element or antenna feed element). Antenna terminals, which are sometimes referred to as the antenna's ground and feed terminals, are electrically connected to the antenna's ground and resonant element, respectively.

Handheld device 100 may have input-output devices such as a display screen 116, buttons such as button 123, user input control devices 118 such as button 119, and input-output components such as port 120 and input-output jack 121. Display screen 116 may be, for example, a liquid crystal display (LCD), an organic light-emitting diode (OLED) display, a plasma display, or multiple displays that use one or more different display technologies. As shown in the example of FIG. 1, display screens, such as display screen 116, can be mounted on front face 122 of handheld electronic device 100. If desired, displays such as display 116 can be mounted on the rear face of handheld electronic device 100, on a side of device 100, on a flip-up portion of device 100 that is attached to a main body portion of device 100 by, for example, a hinge, or by using any other suitable mounting arrangement.

A user of handheld device 100 may supply input commands using user input interface 118. User input interface 118 may include buttons (e.g., alphanumeric keys, power on-off, power-on, power-off, and other specialized buttons), a touch pad, pointing stick, or other cursor control device, a touch screen (e.g., a touch screen implemented as part of screen 116), or any other suitable interface for controlling device 100. Although shown schematically as being formed on the top face 122 of handheld electronic device 100 in the example of FIG. 1, user input interface 118 may generally be formed on any suitable portion of handheld electronic device 100. For example, a button such as button 123 (which may be considered to be part of input interface 118) or other user interface control may be formed on the side of handheld electronic device 100. Buttons and other user interface controls can also be located on the top face, rear face, or other portion of device 100. If desired, device 100 can be controlled remotely (e.g., using an infrared remote control, a radio-frequency remote control such as a Bluetooth remote control). In one embodiment of the present invention where device 100 has cellular phone capability, a speaker (not shown) and a microphone (not shown) are housed in appropriate locations inside housing 112.

Handheld device 100 may have ports such as bus connector 120 and jack 121 that allow device 100 to interface with external components. Typical ports include power jacks to recharge a battery within device 100 or to operate device 100 from a direct current (DC) power supply, data ports to exchange data with external components such as a personal computer or peripheral, audio-visual jacks to drive headphones, a monitor, or other external audio-video equipment. The functions of some or all of these devices and the internal circuitry of handheld electronic devices can be controlled using input interface 118.

Other devices may also be used in conjunction with embodiments of the present invention. These devices include, but are not limited to, portable devices and handheld devices, such as the ones described above. Portable devices may be small portable computers such as those sometimes referred to as ultra-portables. Portable devices may also be somewhat smaller devices. Examples of smaller portable devices include wrist-watch devices, pendant devices, headphone and earpiece devices, and other wearable and miniature devices. One category of portable devices is handheld devices. The invention is described in the context of handheld devices; however the invention may be implemented in any suitable portable electronic device.

Handheld devices may be, for example, cellular telephones, media players with wireless communications capabilities, handheld computers (also sometimes called personal digital assistants), remote controllers, global positioning system (GPS) devices, and handheld gaming devices. Handheld devices may also be hybrid devices that combine the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, and supports web browsing. These are merely illustrative examples.

Figure 2:
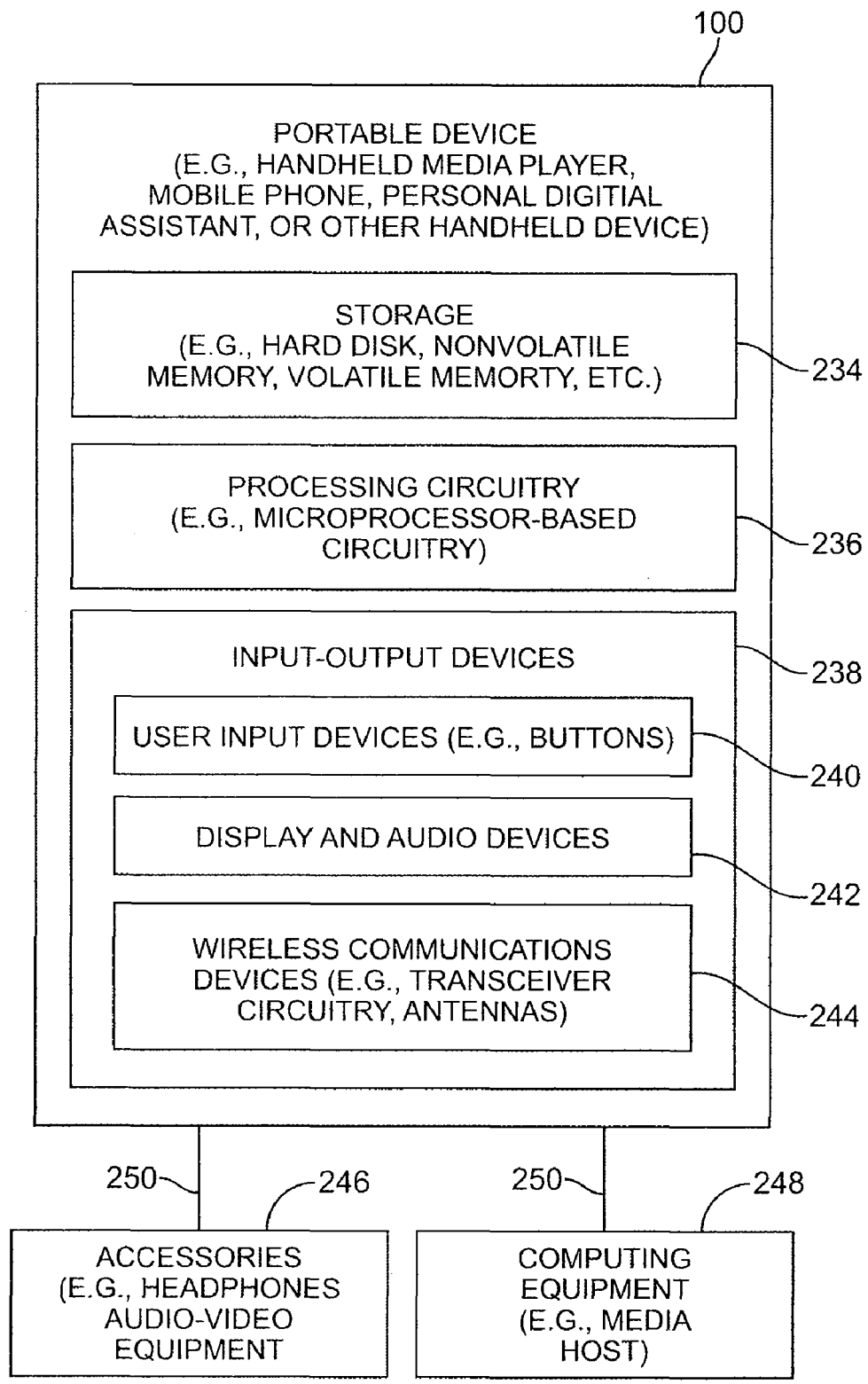
FIG. 2 is a schematic diagram of an illustrative handheld device with wireless capability that may be used in conjunction with embodiments of the present invention.

FIG. 2 is a schematic diagram of an illustrative handheld device with wireless capability that may be used in conjunction with embodiments of the present invention. Handheld device 100 may be a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 100 includes storage 234, which in turn may include one or more different types of storage such as hard disk drive storage, nonvolatile semiconductor memory (e.g., NAND and/or NOR varieties of flash memory, EPROM, EEPROM and/or ROM), volatile memory (e.g., SRAM, DRAM, battery-backed SRAM and/or battery-backed DRAM). Processing circuitry 236 may be used to control the operation of device 100. Processing circuitry 236 may be based on a processor such as a microprocessor and/or a graphics processor and other suitable processor integrated circuits.

Input-output devices 238 may be used to allow data (e.g., text, video, audio) to be supplied to and from device 100. Display screen 116 and user input interface 118 of FIG. 1 are examples of input-output devices 238. Input-output devices 238 can include user input-output devices 240 such as buttons, touch screens, joysticks, click wheels, scrolling wheels, touch pads, key pads, keyboards, microphones, and cameras. A user can control the operation of device 100 by supplying commands through user input devices 240. Display and audio devices 242 may include liquid-crystal display (LCD) screens, light-emitting diodes (LEDs), and other components that present visual information and status data. Display and audio devices 242 may also include audio equipment such as microphone, speakers, and other apparatus. Display and audio devices 242 may contain audio-video interface equipment such as jacks and other connectors for external headphones, monitors and other equipment.

Wireless communications devices 244 may include communications circuitry such as radio-frequency (RF) transceiver circuitry formed from one or more integrated circuits, power amplifier circuitry, passive RF components, antennas (internal and/or external) and other circuitry for handling RF wireless signals. Wireless signals can also be sent using light (e.g., using infrared communications).

Device 100 can communicate with external devices such as accessories 246 and computing equipment 248 via paths 250. Paths 250 may include wired and wireless paths. Accessories 246 may include headphones (e.g., wired or wireless cellular headset and audio headphones) audio-video equipment (e.g., wireless speakers, Hi-Fi systems with integrated docking station, a game controller, or other equipment that receives and plays audio and video content), and stand-alone docking stations. Computing equipment 248 may be a server from which songs, videos, or other media are downloaded wirelessly. Computing equipment 248 may also be a local host (e.g., a user's own personal computer), from which the user obtains a wireless download of music or other media files.

The wireless communications devices 244 may be used to cover communications frequency bands such as the cellular telephone bands at 850 MHz, 900 MHz, 1800 MHz, and 1900 MHz, the global positioning system (GPS) band at 1575 MHz, data service bands such as the 3G data communications band at 2170 MHz band (commonly referred to as UMTS or Universal Mobile Telecommunications System), the WiFi® (IEEE 802.11) band at 2.4 GHz, and the Bluetooth® band at 2.4 GHz. These are merely illustrative communications bands over which wireless communications devices 244 may operate. Additional bands are expected to be deployed in the future as new wireless services are made available. Wireless communications devices 244 may be configured to operate over any suitable band or bands to cover any existing or new wireless services of interest. If desired, multiple antennas may be provided in wireless communications devices 244 to cover more bands or one or more antennas may be provided with wide-bandwidth resonating element(s) to cover multiple communications bands of interest. An advantage of using a broadband antenna design that covers multiple communications bands of interest is that this type of approach makes it possible to reduce device complexity and cost and to minimize the volume within a handheld device that is allocated to antenna structures.

A broadband design may be used for one or more antennas in wireless communications devices 244 when it is desired to cover a relatively larger range of frequencies without providing numerous individual antennas or using a tunable antenna arrangement. If desired, a broadband antenna design may be made tunable to expand its bandwidth coverage or may be used in combination with additional antennas. In general, however, broadband designs tend to reduce or eliminate the need for multiple antennas and tunable configurations.

FIGS. 3A-3E are various perspective views of a stand-alone docking station 350 particularly suitable for use with various embodiments of the present invention. The stand-alone docking station 350 allows a handheld device 352 to communicate with other media devices (not shown). By stand-alone, it is meant that it is physically separated from but operatively connectable to the media device (rather than being integrated therewith). In one embodiment, housing 354 is configured to enclose various electrical and structural components. Housing 354 is also configured to define the shape or form of docking station 350. The shape may for example be substantially rectangular (as shown) or alternatively the shape may be circular, cubical, triangular, or any other suitable geometrical shape. Furthermore, housing 354 may be formed by one or more housing components. For example, housing 354 may include an upper member 356 and a base member 358 that are attached using any suitable technique including for example screws, bolts, snaps, adhesives, and latches.

Within a top surface 360 of the housing as shown in FIGS. 3A, 3B and 3E there is provided an opening 362 for physically receiving a bottom portion 364 of handheld device 352. As shown, opening 362 has a shape that coincides with the shape of handheld device 352, i.e., the bottom portion 364 of handheld device 352 may be inserted within opening 362. The depth of opening 362 is generally configured to keep the user interface of handheld device 352 exposed to the user. Opening 362 may be vertical or sloped. As shown in FIG. 3E, opening 362 is sloped so that handheld device 352 rests in a tilted position within docking station 350. As should be appreciated, a tilted handheld device 352 is easier to use (e.g., more ergonomic). The slope may be widely varied. For example, it may tilt handheld device 252 about 5 to about 25 degrees and more particularly about 15 degrees.

Inside opening 362 there is provided a first connector 366 for engaging a corresponding connector disposed on the bottom surface of handheld device 352. The first connector 366 is typically exposed through the housing 354 so that the handheld device connector can engage it. In the illustrated embodiment, the handheld device connector is a female port and the docking station connector 366 is a male plug. The plug is generally dimensioned for a tight fit within the port so as to secure the connection between the handheld device 352 and docking station 350 (e.g., no interlock except for connector). The first connector 366 is generally sloped to a similar angle as the opening 362 so that engagement occurs between the first connector and the handheld device connector when handheld device 352 is slid into opening 362. As should be appreciated, the sides of the opening 362 serve as guides for placing the connectors in the correct engagement position.

The first connector 366 may be operatively coupled to one or more second connectors, each of which may be used to connect to some external device such as a media device, power plug and the like. In some cases, the information passing through the first connector 366 is directed to a single second connector while in other cases the information is split into multiple second connectors. For example, the contacts of a single connector 366 may be split into different connectors such as one or more data lines, power lines, audio lines and the like. The second connectors may be similar to the first connector or they may be different. Furthermore, multiple second connectors may be similar or they may be different from one another. The second connectors are also exposed through the housing. In some cases, the second connectors are indirectly coupled to the docking station 350. For example, they may be coupled to the docking station 350 through a cord or cable that is attached to the docking station 350. One end of the cord is coupled to the docking station 350 while the other end, which includes the second connector is free to be engaged with an external device. In other cases, the second connectors are directly coupled to the docking station 350. For example, they may be attached to a portion of the docking station 350 without using a cord or cable. In cases such as these, the second connectors are free to be engaged directly to an external device or they may be coupled through a removable cord or cable. Alternatively or additionally, the cord itself may be used to split information, i.e., a Y cord or cable.

The internal components of docking station 350 can best seen in FIG. 3C, which shows the docking station 350 with the top member 356 of the housing 354 removed. As shown, the internal components include at least a first connector 366 and a second connector 368. The internal components may also include an audio out connector 370. The connectors 366-970 are connected via a flex cable 372. The connectors 366-370 are positioned on one or more printed circuit boards 374 that are attached to the base member 358 of the housing 354. The first connector 366 is located at a position that places it within the opening 362 of the housing 354 (as shown in FIG. 3B). The second connector 368 and the audio out connector 370 are located at positions that place them within openings 376 at the backside of the housing 354 for external connection (as shown in FIG. 3D). Also contained within the housing 354 is a ballast 378 enabling the docking station 350 to support handheld device 352 when inserted therein. An EMI shield may also be placed over the flex cable 372 to provide shielding.

FIG. 4 illustrates an exemplary pinout that may be used for connectors such as the connectors 366-370 and other connectors shown in these examples. In a specific embodiment, these connectors are multi-purpose 30 pin connectors with the pin assignment and function as outlined. One or more of the reserved pins may be connected to one or more antenna(s) inside the handheld device, thereby enabling direct electrical connection between the antenna(s) inside the handheld device and external components. This pin out advantageously makes the handheld device compatible with different types of interfaces, such as the USB FireWire interfaces, is described more fully in application Ser. No. 11/519,541, filed Sep. 11, 2006, which disclosure is incorporated herein by reference in its entirety.

Figure 5C:
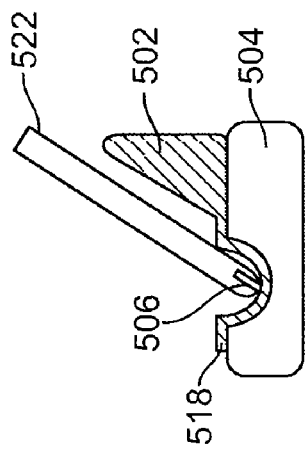
FIGS. 5A, 5B, and 5C respectively illustrate a removable dock insert that includes a reradiating antenna according to an embodiment of the present invention.
Figure 5A:
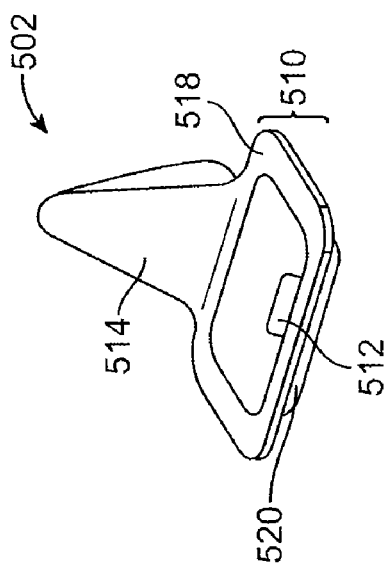
Figure 5B:
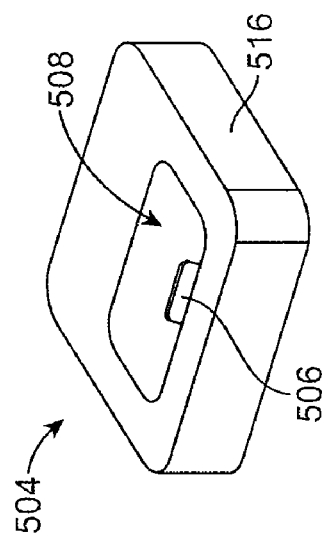

FIGS. 5A, 5B, and 5C respectively illustrate a removable dock insert that includes a reradiating antenna according to an embodiment of the present invention. Specifically, FIG. 5A illustrates an insert 502, while FIG. 5B illustrates a docking station 504. FIG. 5C illustrates a removable dock insert 502 inserted in docking station 504 and a handheld device 522 inserted in removable dock insert 502. Removable dock insert 502 together with docking station 504 provides a platform for quickly and easily coupling a wireless handheld device. Docking station 504 may be a stand-alone unit that is configured to communicate with other devices or systems (e.g., a computer, a Hi-Fi system, a power source, or peripheral devices such as a monitor, a keyboard, and speakers) through wired (e.g., cables) or wireless (e.g., Bluetooth) connections. Alternatively, docking station 504 may be integrated directly into other devices or systems.

As shown in the illustrated example, docking station 504 includes a base 516 and an opening or slot 508 that is partially recessed in the top surface of base 516. One embodiment of docking station 504 particularly suited for use with the some embodiments of the invention is described in more detail with reference to FIGS. 3A-3E above. This and the other inserts described may be adjustable to provide mechanical support for various types of devices.

The shape and size of opening 508 is generally configured to coincide with the shape and size of the bottom end of one or more wireless handheld devices with a particular form factor. As such, the docking station is typically dedicated to handheld devices with such a form factor. Removable inserts, such as insert 502, change the size and shape of opening 508 to enable docking station 504 to accommodate handheld devices with other form factors than that provided by opening 508. While the openings in docking station 504 and dock insert 502 are shown to support a handheld device in an upright (e.g., generally vertical) position, they can also be configured to receive a handheld device along any other side (e.g., top left or right).

In accordance with an embodiment of the invention, a reradiating antenna is embedded in removable dock insert 502 to improve the wireless communication with the wireless handheld device when it is docked in the docking station. In the exemplary embodiment shown, the reradiating antenna (not shown) is housed in an upper portion 514 of insert 502. A bottom portion 510 of insert 502 is configured to fit opening 508. Bottom portion 510 includes a ring-shaped flat portion that rests over a surface region of docking station 504 extending along the perimeter of opening 508. Bottom portion 510 also includes a bowl-shaped portion 520 for receiving a handheld device. Bowl-shaped portion 520 of insert 502 includes an opening 512 at its bottom to allow connector 506 of docking station 516 to protrude through when insert 502 is inserted in the docking station.

FIG. 5C shows a cross-section view of the docking station 504 with removable dock insert 502 inserted in the docking station, and a handheld device 522 coupled to docking station 504 and held in place by removable insert 502. In operation, the antenna in dock insert 502 serves as a reradiating antenna to facilitate wireless communication with handheld device 522. The operative coupling of the antenna inside handheld device 522 with the reradiating antenna inside dock insert 502 may be achieved in a number of ways, including through capacitive coupling, inductive coupling, and direct wire connection.

Figure 6A:
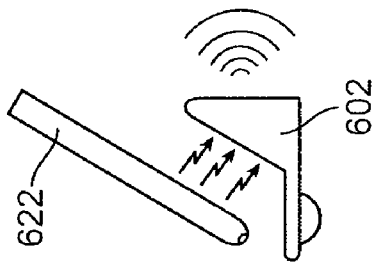
FIGS. 6A-6D illustrate the capacitive coupling employed by embodiments of the present invention.
Figure 6B:
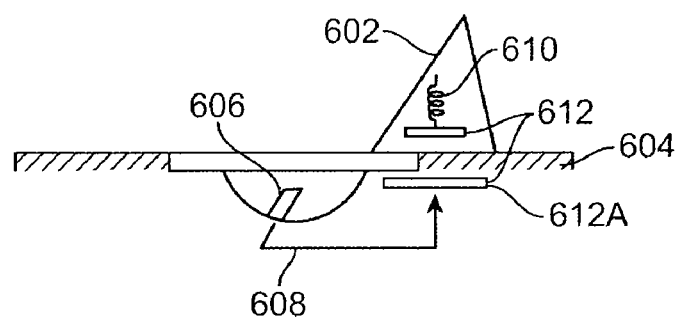
Figure 6C:
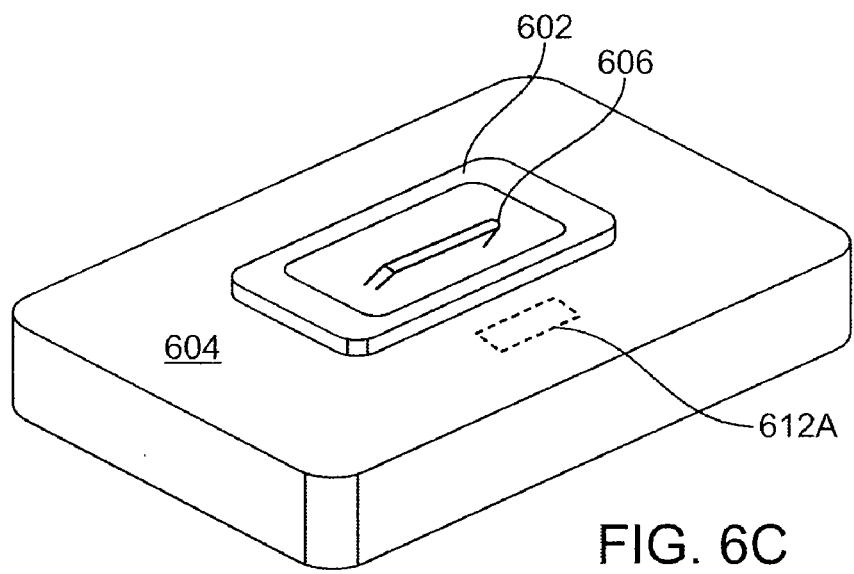
Figure 6D:
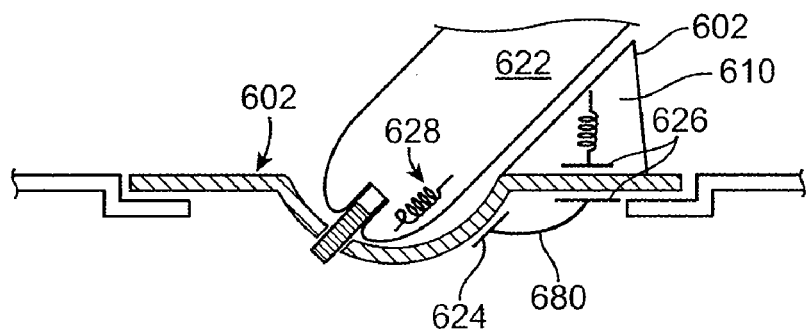

FIGS. 6A-6D illustrate the capacitive coupling employed by embodiments of the present invention. Specifically, FIG. 6A illustrates direct passive coupling while FIGS. 6B-6D illustrate an indirect form of passive coupling. In FIG. 6A, when handheld device 622 is inserted in dock insert 602, the antenna in the handheld device comes in close proximity to the reradiating antenna in the dock insert, enabling coupling between the antennas as depicted by the arrows.

FIG. 6B shows a variation of the capacitive coupling embodiment wherein the antenna(s) in the handheld device are connected a capacitor plate 612A of a capacitor 612 through a connector 606. Note that more than reradiating antenna and more than one capacitor may be used to enable multiple frequency bands (e.g., Bluetooth, WiFi, and cellular.) One or more wires 608 extending through docking station 604 may be used to connect the appropriate pin(s) of connector 606 to capacitor plate(s) 612A. As shown, one plate of capacitor 612 is housed in docking station 604 and the other plate of capacitor 612 is housed in removable dock insert 602 and is connected to antenna 610 embedded in dock insert 602.

FIG. 6C shows a top view of docking station 604 illustrating the location plate 612A of capacitor 612 in docking station 604. The upper portion of dock insert 602 is removed in FIG. 6C to reveal the location of capacitor plate 612 inside docking station 604. The embodiment depicted by FIGS. 6B and 6C is advantageous in that the extent of the capacitive coupling is made independent of the location of the antenna(s) in the handheld device.

FIG. 6D shows yet another variation of the capacitive coupling embodiment where two capacitors are used. As shown, handheld device 622 includes one or more antenna(s) 628 at a base of handheld device 622 near the connector. Antenna 628 in handheld device 622 is coupled to reradiating antenna in removable insert 602 by first coupling to capacitor plate 624, and then by coupling to capacitor 626. A wire 630 connects plate 624 to a plate of capacitor 626. In one embodiment, capacitor plate 624 and both plates of capacitor 626 are formed as part of removable dock insert 602 so that no modification to the docking station is required.

A direct wire connection between the antenna(s) in the handheld device and the reradiating antenna(s) in the removable dock insert may be implemented, in accordance with anther embodiment of the invention. For example, in FIG. 6B, an opening may be formed in an upper surface of docking station 604 through which wire(s) 608 may be directly connected to reradiating antenna(s) 610. Inductive coupling techniques, similar to above-described capacitive coupling techniques, may also be used to achieve electrical communication between the antenna(s) in the handheld device and the reradiating antenna(s) in the removable dock insert.

Although the removable dock insert shown in FIGS. 5A-5C and 6A-6D has the reradiating antenna(s) embedded in an upper portion of the insert, the invention is not limited as such. In an alternative embodiment, the reradiating antenna(s) may be embedded in the ring-shaped flat portion 518 of insert 502 in FIG. 5A. An example is shown in the following figure.

Figure 7A:
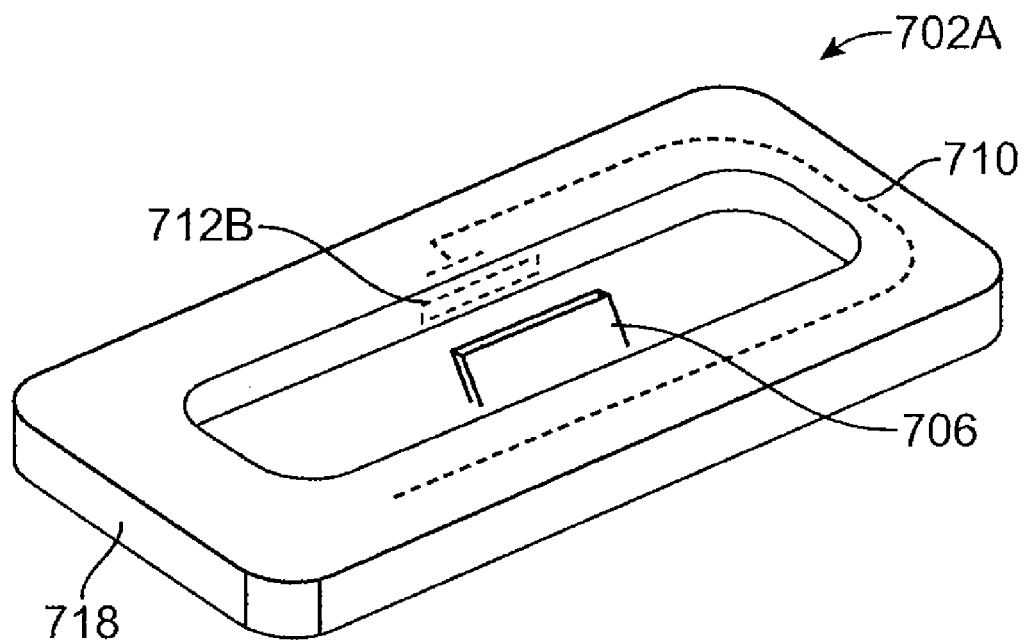
FIGS. 7A-7B illustrate another removable dock insert that includes a reradiating antenna according to an embodiment of the present invention.
Figure 7B:
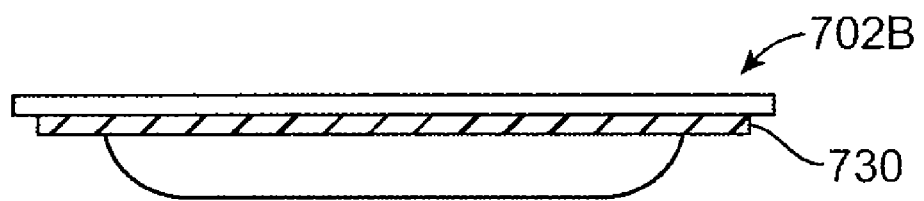

FIGS. 7A-7B illustrate another removable dock insert that includes a reradiating antenna according to an embodiment of the present invention. FIG. 7A shows an enlarged view of the ringed-shaped flat portion 718 of a removable dock insert 702A in accordance with one embodiment of the invention. Dashed line 710 depicts a conductive trace symbolizing one or more antenna(s). Antenna(s) 710 are embedded in the flat portion 718 of removable insert 702A. Flat portion 718 may be made of non-conductive material such as plastic. Any one of the techniques for achieving operative coupling between the antenna(s) in a handheld device and reradiating antenna(s) 710 described above may also be used in the FIG. 7A embodiment. For example, a capacitor plate 712B to which antenna 710 is connected may be embedded in ring-shaped flat portion 718, with a counterpart capacitor plate housed in the docking station in close proximity to capacitor plate 712B.

FIG. 7B shows another variation where a PCB antenna 730 is attached to an under-side of the ring-shaped flat portion of a removable insert 702B. In yet other embodiments, known conductive painted circuit techniques are integrated with the removable insert to implement the re-radiation antenna(s) of the removable dock insert. In general, any known antenna implementation with a tuned antenna capable of repeating (reradiating) RF signals by proximity, as well as various ways of integrating such antenna(s) with a removable dock insert, is intended to fall within the scope of the invention.

While the invention has been described in the context of a docking station, it is not limited as such. In general, a removable housing adapted to either include a reradiating antenna or to be connected to an external reradiating antenna may be constructed for any wireless handheld device accessory, in accordance with embodiments of the invention. For example, it is common to not use a docking station but rather to use a cable for purposes of charging or data transfer. Accordingly, various embodiments of the present invention incorporate a reradiating antenna in a cable housing. An example of this is shown in the following figures.

Figure 8A:
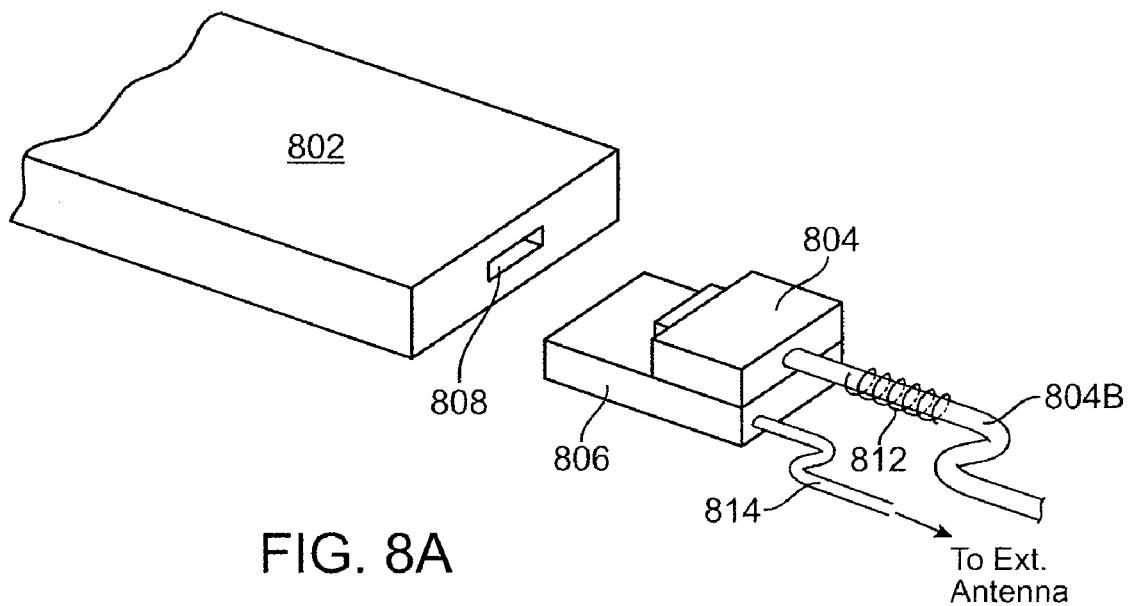
FIGS. 8A and 8B illustrate an embodiment of a cable connector according to an embodiment of the present invention.
Figure 8B:
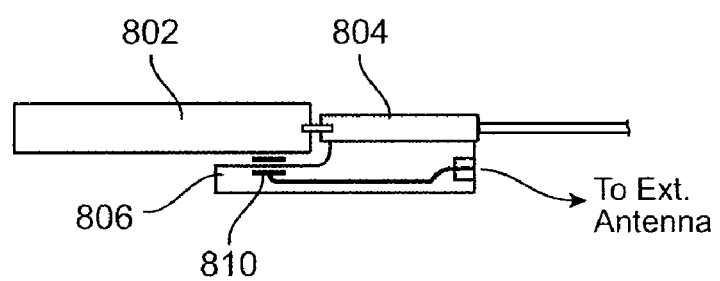

FIGS. 8A and 8B illustrate an embodiment of a cable connector according to an embodiment of the present invention. FIG. 8A illustrates a cable housing 606 connected to a cable 804. Cable housing 606 is formed to insert into slot 608 in wireless handheld device 802.

FIG. 8B shows a cross-section view revealing relevant components inside removable housing 806. A capacitor plate 810 facilitates capacitive coupling between antenna(s) disposed at a base of a handheld device in close proximity to capacitor plate 810. Capacitor plate 810 is electrically connected to one or more reradiating antennas formed inside or outside removable housing 806. In the embodiments where the reradiating antenna(s) is embedded in housing 806, the wire connectivity 814 to external reradiating antennas is eliminated. Another example where wire connectivity 814 is eliminated is shown in FIG. 8A. As shown, a reradiating antenna 812 is wrapped around the cable wire portion 804B of cable 804. The FIG. 8B embodiment depicts the case where capacitor plate 810 is connected to an external reradiating antenna (not shown).

Figure 9A:
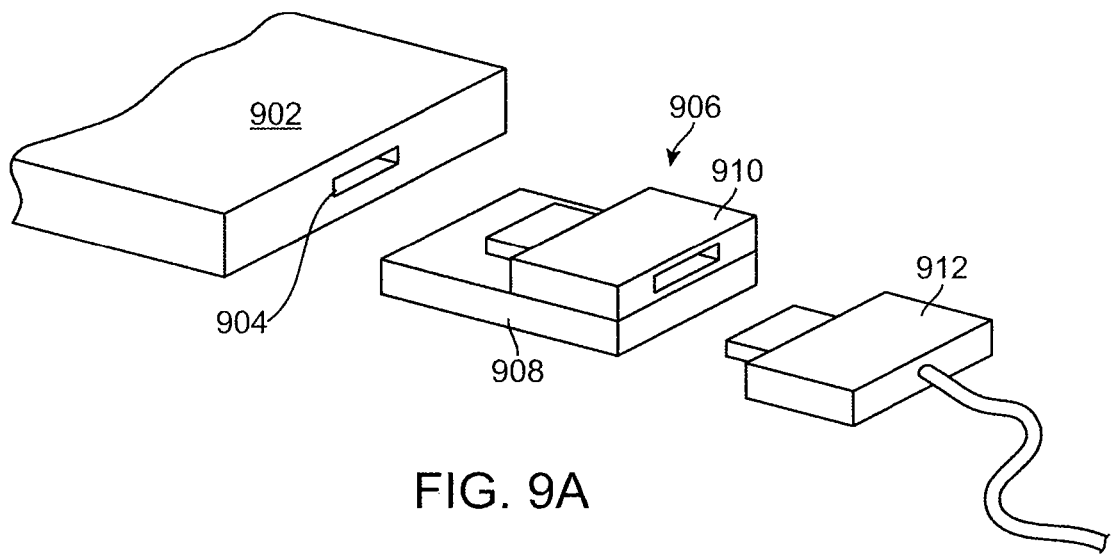
FIGS. 9A and 9B respectively show a perspective view and a cross-section view of an embodiment where a housing serves as an intermediate connector between a cable and a handheld device.
Figure 9B:
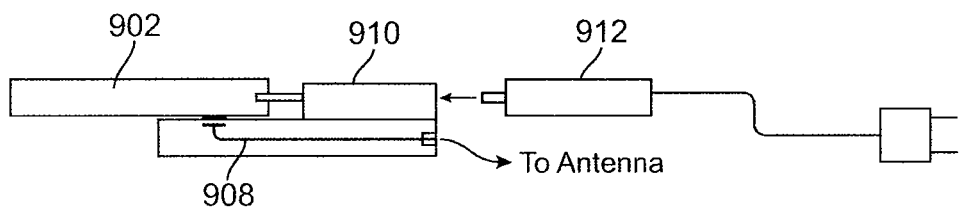

FIGS. 9A and 9B respectively show a perspective view and a cross-section view of an embodiment where a housing 906 serves as an intermediate connector between a cable 912 and a handheld device 902. This embodiment enables incorporating active components (such as amplifiers) in housing 906. Power is provided to the active components in housing 906 via cable 912 when cable 912 is connected to a device capable of providing power. Similar to the embodiment depicted by FIGS. 8A, 8B, the reradiating antenna(s) may be housed inside or outside housing 910, and capacitive coupling may be used to operatively couple the antenna(s) in handheld device 902 to reradiating antenna(s), as described above.

While the above examples illustrate a reradiating antenna in either an insert or cable connection, other embodiments of the present invention provide reradiating antennas in other locations. For example, according to another exemplary embodiment of the present invention, the reradiating antenna or antennas and capacitor plates, if needed, are located in a docking station.

The above examples make use of passive coupling between an antenna in the handheld unit and reradiating antenna. This passive coupling may be either capacitive or inductive in nature. Further, the two may be used in the same embodiment. For example, where there are two couplings employed, such as in the example of FIG. 4D, one can be inductive while the other is capacitive.

In some applications it is desirable to increase the receiving sensitivity and transmit power of the handheld device. In such a situation, the reradiating antenna may be coupled to an active gain circuit. In a specific embodiment of the present invention, a boost circuit is used to gain the signal on the reradiating antenna. Received signals are amplified using a low-noise amplifier (LNA). Signals to be transmitted are amplified using a power amplifier (PA). An example is shown in the following figure.

Figure 10:
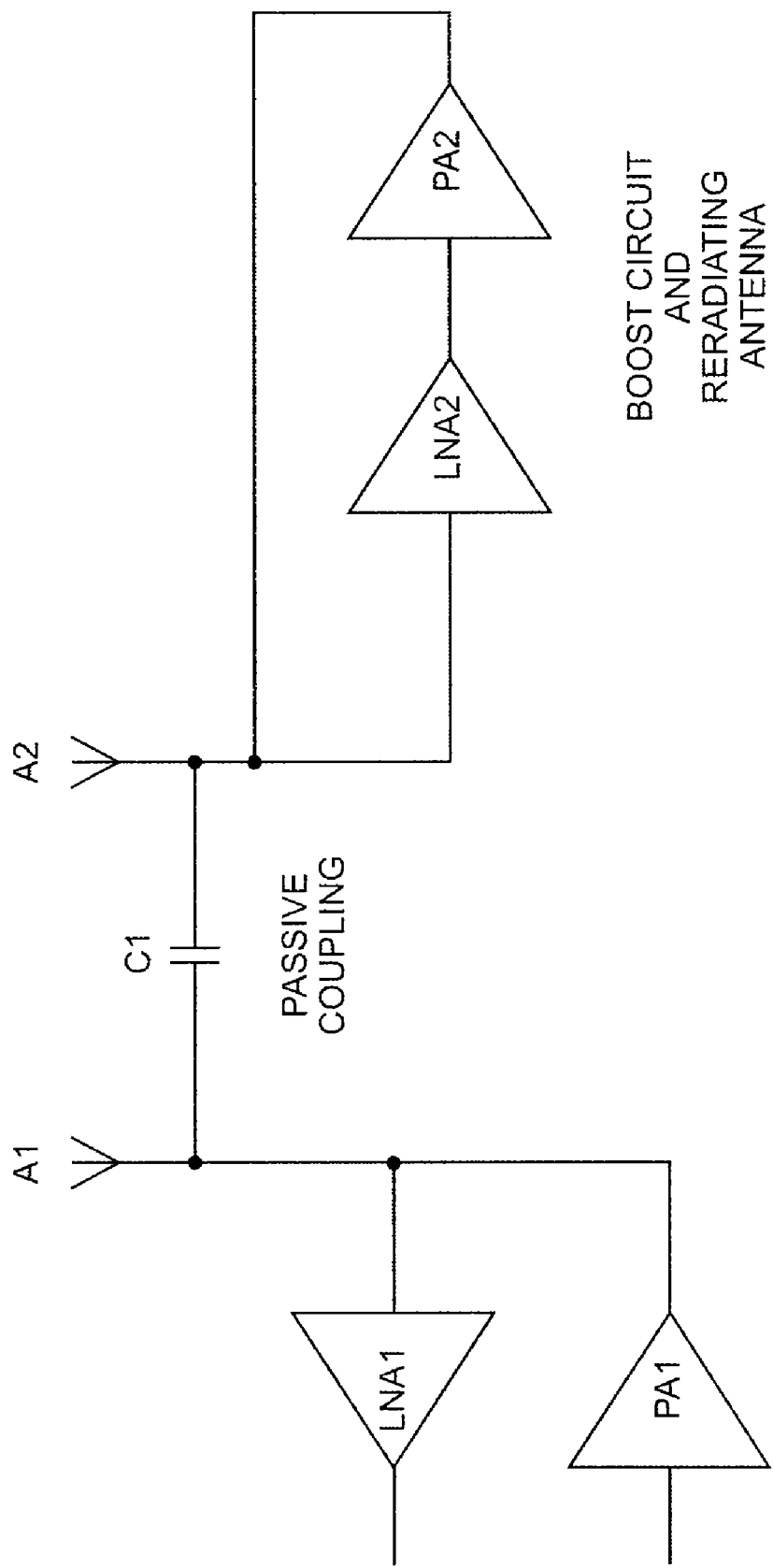
FIG. 10 illustrates a reradiating antenna connected to a boost circuit according to an embodiment of the present invention.

FIG. 10 illustrates a reradiating antenna connected to a boosting circuit according to an embodiment of the present invention. This figure illustrates circuitry located on a handheld device as well as circuitry located in a docking station or an adapter such as an insert or cable adapter. Specifically, low noise amplifier LNA1 and power amplifier PA1 are located on the handheld device and are in communication with receiving and transmitting circuitry (not shown). This receiving and transmitting circuitry may be connected to other circuitry, such as a Bluetooth circuit, such that the handheld device can be in communication with a Bluetooth headset. Boost circuitry LNA2 and PA2 are located on the adapter or docking station. Voice or data signals generated on the handheld device (or received by the handheld device, for example from the Bluetooth headset described above) are amplified by power amplifier PA1 and placed on antenna A1. Antenna A1 is passively coupled to antenna A2 via passive coupling capacitor C1. Signals received on antenna A2 are gained by a low noise amplifier LNA2 and power amplifier PA2 and placed on antenna A2, where it is transmitted to a network or other device, such as a cellular, local, or other type of network.

Signals may be received at antenna A2 from a cellular, local, or other network. Again, the signals are gained by low noise amplifier LNA2 and power amplifier PA2 and placed back on the antenna A2. The signals are then passively coupled to antenna A1 via the past live coupling capacitor C1. The signals received at antenna A1 are gained by the low noise amplifier LNA1 and provided to handheld device receiving circuitry (not shown). At this point, they may be transmitted, for example to the Bluetooth headset described above.

While both an LNA and PA are shown in this example, other embodiments of the present invention use only one amplifier. Various embodiments of the present invention that employ boost circuits may receive power in a number of ways. For example, power is readily available in most docking stations. An adapter may receive power externally, or it may receive power via a connector in a docking station or cable to which it is connected. For example, an adapter may have a connector fitting that receives a connector from a docking station or cable, and another connector to provide a connection to the handheld device.

In various embodiments of the present invention, the signals received and transmitted by the reradiating antenna are voice signals. In other embodiments, they are data signals carried by a cellular service. In still other embodiments, the signals are data signals from a local or wide-area wireless network such as IEEE 802.11a, b, g, or other standard or proprietary signaling protocols.

In various embodiments of the present invention, once the signal is received and amplified by the boost circuit, it is processed in some manner. This processing may, for example, convert a data signal from one protocol to another. For example, it may be desirable for a handheld device having 802.11g capability to be able to communicate over an 802.11a network. In such a situation, 802.11a data received from a network is converted to 802.11g data and coupled to an antenna in the handheld device. Similarly, 802.11g data coupled from the handheld device is converted to 802.11a data and transmitted to the network. An example is shown in the following figure.

Figure 11:
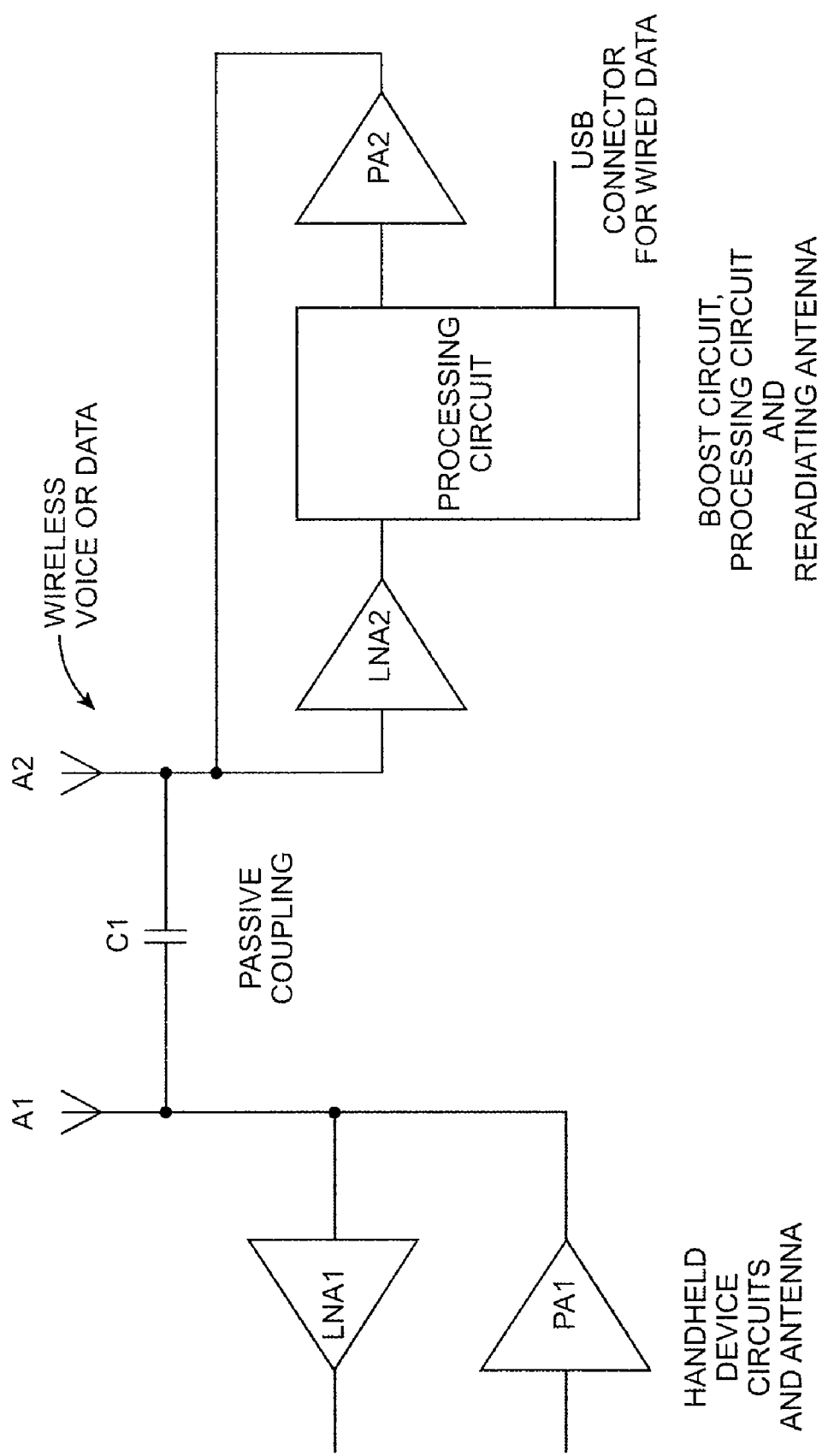
FIG. 11 illustrates a reradiating antenna connected to a boost circuit that includes a processing circuit according to an embodiment of the present invention.

FIG. 11 illustrates a reradiating antenna connected to a boosting circuit that includes a processing circuit according to an embodiment of the present invention. This figure includes circuitry located on a handheld device as well as circuitry located in a docking station or an adapter, such as an insert or cable adapter. Specifically, low noise amplifier LNA1 and power amplifier PA1 are located on a handheld device. Low noise amplifier LNA2, power amplifier PA2, and the processing circuits are located in a docking station or adapter. Signals transmitted by the handheld device are gained by the power amplifier PA1 and placed on the antenna A1. The antenna A1 in the handheld device is capacitively coupled to antenna A2 in the docking station or adapter via the passive coupling capacitor C1. Signals received at antenna A2 are gained by the low noise amplifier LNA2 and received by the processing circuits.

The processing circuits may perform one or more of a number of functions. For example, the processing circuits may receive data in a first format or protocol, and output data in a second format or protocol. The output of the processing circuit is gained by power amplifier PA2 and provided on the antenna A2, where it is transmitted to a cellular, local, or other network.

Signals received from a cellular, local, or other network can be received on antenna A2. The signals are gained by the low noise amplifier LNA2, which again provides an upper to processing circuit. When receiving signals, the processing circuit may perform the inverse function that is performed on outgoing data. For example, data received in the second format or protocol may be converted to data in the first format or protocol. The out of the processing circuit is gained by power amplifier PA2 and transmitted to antenna A1 on the handheld device via antenna A2 and the passive coupling capacitor C1. Signals received on antenna A1 are gained by low noise amplifier LNA1 on the handheld device and provided to other receiving circuitry (not shown).

In various embodiments of the present invention, it is desirable to wirelessly update the handheld device with new data, such as music or video data, without having to use a local or other wireless network. In various embodiments of the present invention this data may be provided to a processing circuit using a USB or other type of connector. The processing circuit then provides data to the power of amplifier PA, which transmits the data to the handheld device as before.

Various embodiments of the present invention may use the passive and active coupling described above for other reasons than data and voice transmission. For example, energy that may be used to charge a battery may be coupled to a handheld device. Accordingly, another exemplary embodiment of the present invention provides inserts, cable connectors, and docking stations that are configured to include inductive charging. This technique when combined with the capacitive coupling implementation of the reradiating antenna or antennas advantageously creates a wireless solution where both the wireless performance of the handheld device is improved and power charging capability is provided. An example is shown in the following figure.

Figure 12:
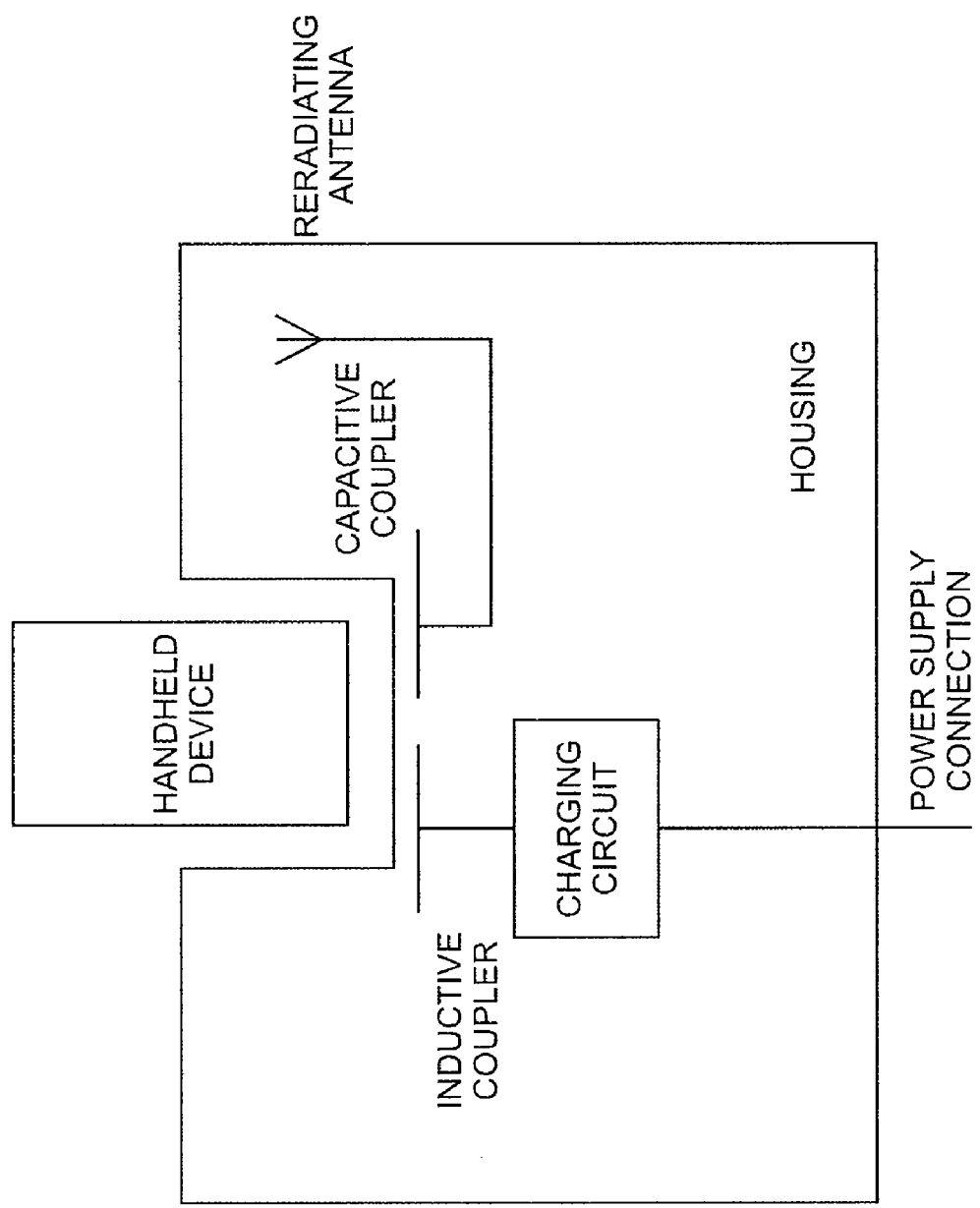
FIG. 12 illustrates a docking station that includes a reradiating antenna and an inductive charging circuit for inductively charging a handheld device according to an embodiment of the present invention.

FIG. 12 illustrates a docking station that includes a reradiating antenna and an inductive charging circuit for inductively charging a handheld device according to an embodiment of the present invention. As shown, the dock housing is configured to receive a handheld device. While the dock housing is shown to receive the handheld device in an upright position, other dock housing configurations for receiving the handheld device along its other sides are also possible. The dock housing is further configured to enable charging the battery of the handheld device through an inductive charge coupling mechanism, and to also provide improved wireless communication by integrating the reradiating antenna as shown. The charge circuit is connected between the inductive charge coupling mechanism and a port for receiving power.

In this above example, capacitive coupling is used for voice and data transfer between the handheld device and reradiating antenna. In other embodiments of the present invention, other coupling, such as inductive, may be used. Also, as shown above, the coupling may be active. Also, the charging circuit is shown as using inductive coupling. Alternately, capacitive coupling may be used for the charging circuit.

Typically, the charging circuit generates a current in an inductive coupler, which in turn generates a current in the handheld device. This current is then used to charge a battery (not shown) on the handheld device. Similarly, voice or other data is capacitively coupled between the handheld device and the reradiating antenna via the capacitive coupler. In a typical embodiment of the present invention, these two circuits have the potential for interfering with each other. Accordingly, embodiments of the present invention typically take one or more measures to reduce this interference.

For example, the two circuits in the dock housing can be shielded from each other using copper cladding, Faraday cages, or other such techniques. Also, the circuits can be arranged to operate at different times. For example, the charging circuit can be shut down when data is received or transmitted between the docking station and the handheld device. Alternately, the frequency at which the charging circuit operates can be varied in a frequency hopping manner. That is, by frequency hopping, spread spectrum techniques can be used. By varying the frequency of operation of the charging circuit as a function of time, the spectrum of the interfering signal can be spread over a wide range of frequencies and thereby reduced.

While the above examples show the handheld unit in a receptacle, when passive or active coupling is used for voice or data transmission as well as charging, a conventional receptacle that includes a connector is no longer required. This is desirable as it removes the necessity of aligning the handheld device to the connector. It also eliminates a connector that may become fouled with particulate matter such as food crumbs. Moreover, it electrically isolates a user's handheld device from docking station circuitry. This is particularly desirable where physical security is a concern, such as on an airliner. In such a situation, a connector-free receptacle or cradle means the handheld device can be isolated from airplane circuitry.

In this case, other form factors, for example the cradle from the above airplane example, or a simple flat surface for home or office use, can be used as a docking station receptacle. The docking station may include inductive or other charging. Voice and data may be received by the docking station either wirelessly or via a wired connection and provided to a handheld device via a reradiating antenna that may be either passive or active. An example is shown in the following figure.

Figure 13:
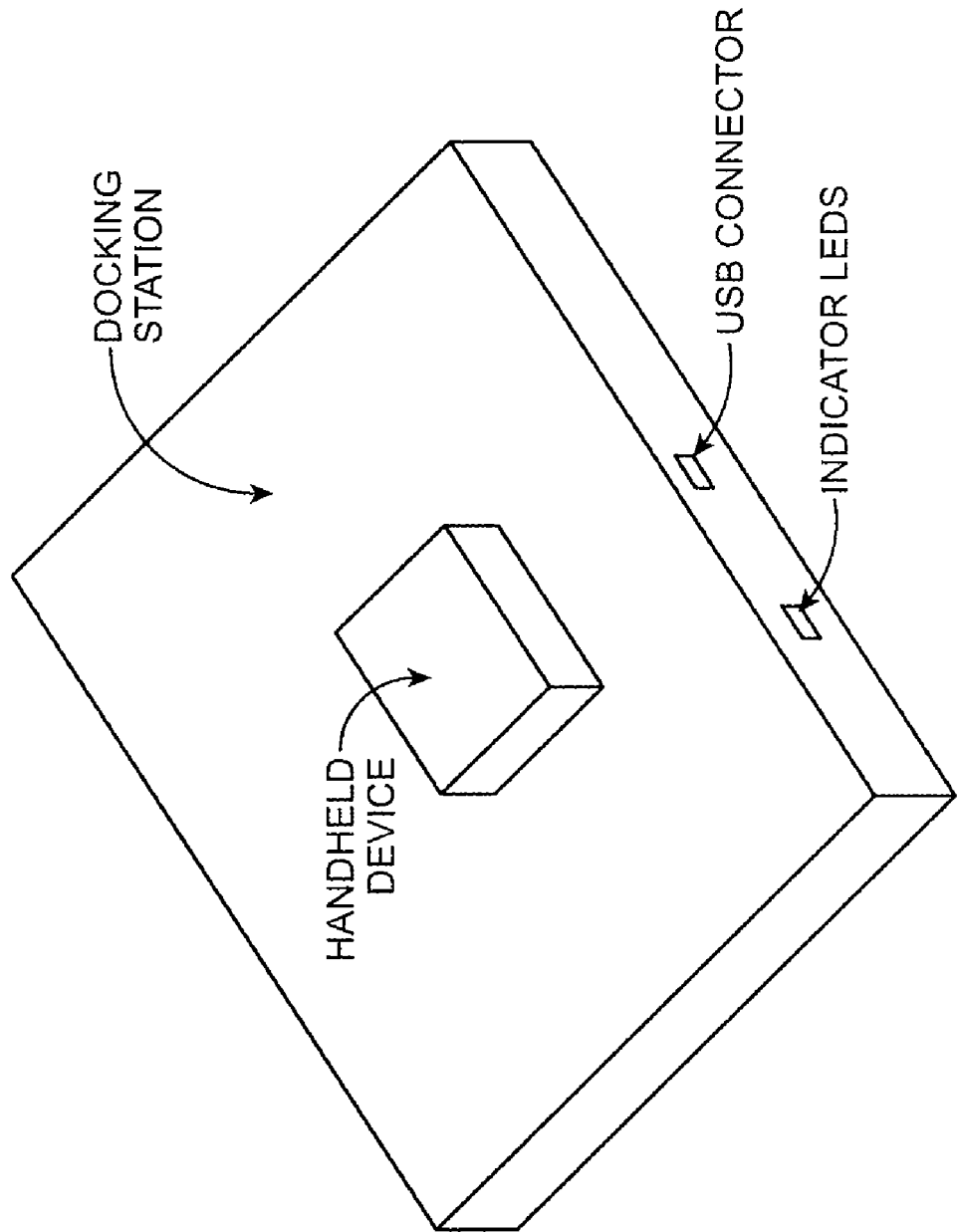
FIG. 13 illustrates a flat surface docking station that includes a reradiating antenna and an inductive charging circuit for inductively charging a handheld device according to an embodiment of the present invention.

FIG. 13 illustrates a docking station having a flat surface according to an embodiment of the present invention. As this figure indicates, no receptacle in the traditional sense is needed, though one may be used to ensure proper alignment between components on a handheld device and the docking station. The docking station can be as simple as a flat surface as shown here. The docking station may be built into a tabletop, or be formed as a device to sit on a desk, computer station, or other location. In this example, the handheld device is simply laid flat on the docking station for charging, synchronizing, or to make use of a reradiating antenna. Accordingly, the docking station may include a reradiating antenna, charging circuit, and other processing circuitry.

Optional indicator LEDs may indicate when data is being transferred, when charging is occurring, or other such events. If power is needed for the charging circuit, it may be provided by a separate power connector (not shown), or a via a data connector, such as the optional USB connector shown in this example. Data, for example music and video data, can be loaded on the handheld device. This data may be received wirelessly or via the USB connector and provided to the handheld device as shown in FIG. 11. While the flat surface in this example is shown as a docking station, in other embodiments of the present invention, the flat surface may be an adapter that connects to any docking station or cable, as shown above In the above examples, data, such as music and video data, is received either in a wired or wireless manner and coupled to a handheld device. In some situations this provides an undesirably slow transfer. Accordingly, various embodiments of the present invention utilize faster methods of data transfer. A specific embodiment uses an optical link to transfer data. Another employs a wireless link. A faster data link such as one of the above can be combined in a docking station along with inductive charging and a passive or active reradiating antenna to provide a connector-free, and if desired, receptacle-free, docking station. An example is shown in the following figure.

Figure 14:
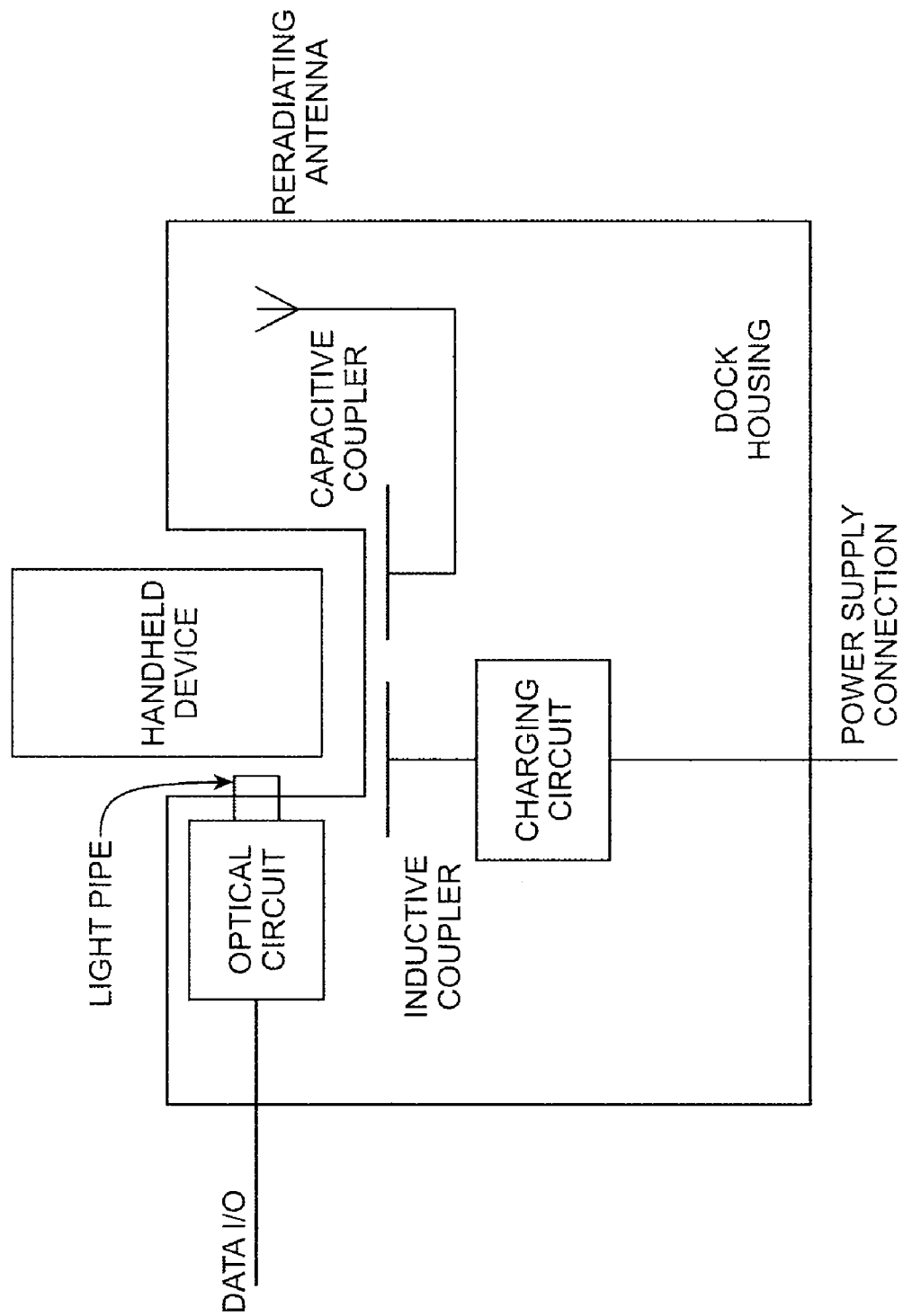
FIG. 14 illustrates a docking station that includes an optical port for data transmission, a reradiating antenna, and an inductive charging circuit for inductively charging a handheld device according to an embodiment of the present invention.

FIG. 14 illustrates a docking station that includes an optical port for data transmission, a reradiating antenna, and a charging circuit that is capable of inductively charging a handheld device according to an embodiment of the present invention. This figure includes a reradiating antenna that is capacitively coupled to an antenna on the handheld device via a capacitive coupler. As before, a charging circuit charges a battery in the handheld device via the inductive coupler. To provide faster data updates than those that can be achieved via a reradiating antenna, an optical circuit is included. Data is received and transmitted via the data I/O port by the optical circuit. The optical circuit transmits and receives data to and from the handheld device via a light pipe. In other embodiments of the present invention, the optical circuit is replaced by a wireless circuit, while in other embodiments, the optical circuit receives and transmits data to a cellular, local, or other network via a wireless circuit. The data I/O connection can be a connection such as a USB, FireWire, or a connector such as the 30 pin connector shown in FIG. 4, or it can be a wireless connection, as described above.

Handheld devices that are designed to be compatible with the above docking stations are distinct, connector-free devices. However, these devices, unless they also include a connector, are not compatible with legacy devices such as speaker systems, alarm clocks, and the like. Accordingly, it is desirable to provide an adapter to interface between a connector of a legacy device and these newer, connector-free devices. An example of such an adapter is shown in the following figure.

Figure 15:
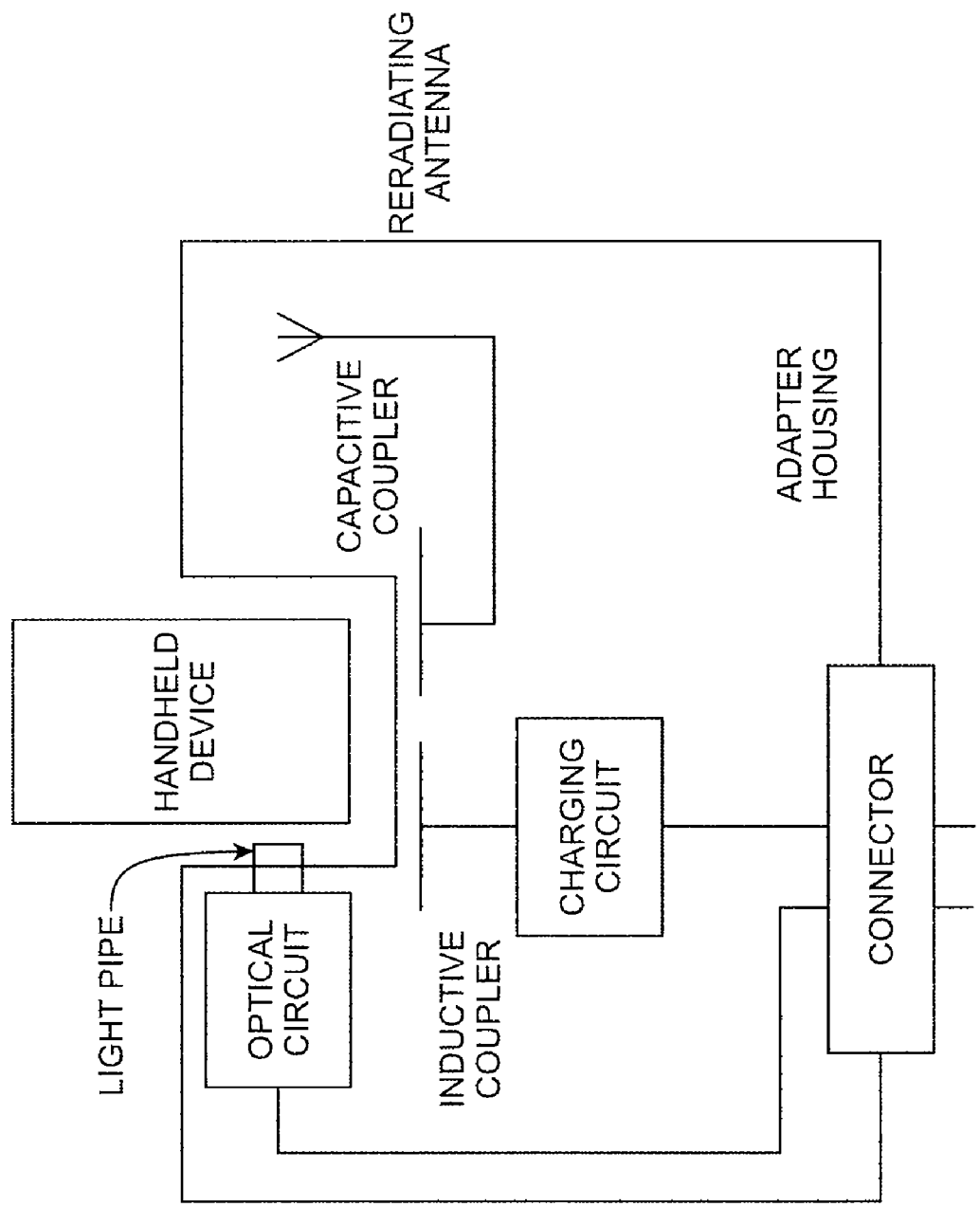
FIG. 15 illustrates an adapter that interfaces between a connector such as the 30 pin connector in FIG. 4 and a handheld device, and includes a reradiating antenna, an optical data interface, and an inductive charging circuit.

FIG. 15 illustrates an adapter that interfaces between a connector, such as the 30 pin connector in FIG. 4, and a handheld device. The adapter includes a reradiating antenna, an optical data interface, and an inductive charging circuit. This adapter can be formed as a tray adapter such as those shown in FIGS. 5, 6, and 7 above, as a cable adapter such as those shown in FIGS. 8 and 9 above, or as other adapters consistent with embodiments of the present invention.

As before, the adapter housing can include an optical circuit, charging circuit, and reradiating antenna. In this, and in each of the other examples, embodiments of the present invention may include any one or more of these, as well as other types of circuits and active and passive components. The charging circuit and optical circuit receive power and data signals via the connector. The connector may connect to a connector such as the 30 pin connector shown in FIG. 4, though in other embodiments of the present invention, other connectors, such as USB or FireWire connectors can be used. This adapter may have a receptacle to hold the handheld device for purposes of antenna or optical alignment, though no physical connector is required. Alternately, receptacle-free adapters may be used, such as a flat surface as shown in FIG. 13.

In the various embodiments described above, multi-frequency or communication protocols can be either shared by a single reradiating antenna or implemented using multiple reradiating antennas. As indicated earlier, the removable housing may be configured for use in many types of applications, such as a stand-alone or integrated docking station, a cable, or even in an aircraft where each passenger seat is equipped with docking station to enable cellular and other wireless and wired forms of communication with a passenger's wireless handheld device. In the aircraft application, depending on the form factor of the handheld device of a passenger, an appropriate one of a variety of number of removable housings with embedded reradiating antenna(s) and/or inductive recharging capability may be provided to the passenger by the aircraft attendant. Using, for example, a Bluetooth enabled earpiece, the passenger can use the cellular phone capability of the handheld device as it is docked in the docking station.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A removable insert to be placed between a portable electronic device and a docking station that includes a media bay in which the portable electronic device can be docked, the portable electronic device including an internal antenna and a first connector and the docking station including a second connector positioned within the media bay that is adapted to mate with the first connector, the removable insert comprising:
    a housing including an insert portion adapted to fit within the media bay, a receiving portion adapted to receive the portable media device, and an opening that extends through the insert portion and receiving portion; and
    one or more reradiating antennas integrated in the housing;
    wherein the second connector protrudes through the opening in the housing when the insert portion of the housing is fitted within media bay; and
    wherein, when the insert portion of the housing is fitted within media bay and the portable electronic device is placed in the receiving portion of the housing and docked in the docking station so that the first connector is mated with the second connector, the one or more reradiating antennas are configured to wirelessly couple to the internal antenna in the portable electronic device and reradiate RF signals transmitted and received by the internal antenna to facilitate wireless communication with the portable electronic device.

2. The removable insert set forth in claim 1 wherein the one or more reradiating antennas comprise a plurality of reradiating antennas, each tuned for a different frequency band.

3. A docking station for a portable electronic device that includes an internal antenna and a first connector, the docking station comprising:
    a housing;
    a media bay formed in the housing and adapted to receive the portable electronic device;
    a second connector positioned within the media bay and adapted to mate with the first connector; and
    one or more reradiating antennas integrated in the housing;
    wherein, when the portable electronic device is docked in the media bay so that the first connector is mated with the second connector, the one or more reradiating antennas are configured to wirelessly couple to the internal antenna in the portable electronic device and reradiate RF signals transmitted from and received by the internal antenna in absence of wired connectivity to a reradiating antenna external to the housing.

4. The docking station set forth in claim 3 wherein the one or more reradiating antennas comprise a plurality of reradiating antennas, each tuned for a different frequency band.

5. The docking station set forth in claim 3 further comprising charging circuitry to charge a battery in the portable electronic device when the portable electronic device is placed in the media bay and the first connector is mated with the second connector.

6. The docking station set forth in claim 3 further comprising a third connector operatively coupled to the second connector to enable power to be delivered to the docking station to charge a battery in the portable electronic device when the portable electronic device is placed in the media bay and the first connector is mated with the second connector.

7. The removable insert of claim 1 further comprising a capacitor plate configured to enable capacitive coupling between the one or more reradiating antennas in the removable insert and the internal antenna located in the handheld device.

8. The removable insert of claim 1 wherein the removable insert is adjustable to provide mechanical support to a plurality of types of handheld devices.

9. The removable insert of claim 1 wherein the removable insert further comprises an amplifier.

10. The docking station of claim 3 further comprising an optical circuit to transfer data to and from the portable electronic device.

11. The docking station of claim 10 wherein the optical circuit receives data via a USB connector.

12. The removable insert of claim 1 further comprising a charging circuit to passively couple a charge to the portable electronic device.

13. The removable insert of claim 12 wherein the charging circuit inductively couples a charge to the portable electronic device.

* * * * *